(12) United States Patent
Johanson et al.

(10) Patent No.: US 8,128,123 B2
(45) Date of Patent: Mar. 6, 2012

(54) INFLATOR FOR AN AIR-BAG

(75) Inventors: Mats Bo Ivar Johanson, Fristad (SE); Björn Svärd, Landvetter (SE)

(73) Assignee: Autoliv Development AB, Vargarda (SE)

(*) Notice: Subject to any disclaimer, the term of this patent is extended or adjusted under 35 U.S.C. 154(b) by 83 days.

(21) Appl. No.: 12/811,471

(22) PCT Filed: Jan. 15, 2008

(86) PCT No.: PCT/GB2008/000122
§ 371 (c)(1),
(2), (4) Date: Jul. 1, 2010

(87) PCT Pub. No.: WO2009/090356
PCT Pub. Date: Jul. 23, 2009

(65) Prior Publication Data
US 2010/0283231 A1    Nov. 11, 2010

(51) Int. Cl.
*B60R 21/26* (2006.01)
(52) U.S. Cl. .................. 280/737; 280/741
(58) Field of Classification Search .......... 280/737, 280/741, 736
See application file for complete search history.

(56) References Cited

U.S. PATENT DOCUMENTS

| | | | | |
|---|---|---|---|---|
| 5,348,344 | A | * | 9/1994 | Blumenthal et al. ......... 280/737 |
| 5,582,806 | A | * | 12/1996 | Skanberg et al. ............ 422/305 |
| 5,820,161 | A | * | 10/1998 | Svensson ..................... 280/737 |
| 5,992,881 | A | * | 11/1999 | Faigle ......................... 280/737 |
| 6,186,540 | B1 | * | 2/2001 | Edgren ........................ 280/735 |
| 6,247,725 | B1 | | 6/2001 | Moller |
| 6,672,616 | B2 | * | 1/2004 | Jonsson et al. .............. 280/737 |
| 7,665,763 | B2 | * | 2/2010 | Bjorklund et al. ........... 280/737 |
| 7,695,009 | B2 | * | 4/2010 | Johanson et al. ............. 280/737 |
| 2002/0130502 | A1 | | 9/2002 | Jonsson et al. |

FOREIGN PATENT DOCUMENTS

| | | |
|---|---|---|
| GB | 2373310 A | 9/2002 |
| GB | 2416199 A | 1/2006 |
| GB | 2417066 A | 2/2006 |

OTHER PUBLICATIONS

International Search Report and Written Opinion of the ISA for PCT/GB2008/000122, ISA/EP, Rijswijk, NL, mailed Nov. 20, 2008.

* cited by examiner

*Primary Examiner* — Faye M. Fleming
(74) *Attorney, Agent, or Firm* — Harness, Dickey & Pierce, P.L.C.

(57) ABSTRACT

An inflator for an airbag comprises a bottle (2) containing a pressurized oxidizable gas and a bottle (4) containing a pressurized oxidizing gas, the bottles being connected with a structure (12, 16) providing a chamber (14) that has an outlet, for example provided by a conduit (16), for connection with a vehicle airbag. The bottles have respective first discharge openings (18) and further discharge openings (18a) sealed by respective sealing foils. The inflator includes a first pyrotechnic squib (22) which when fired causes the sealing foils over the first openings (18) to rupture to allow the gases from bottles (2, 4) to pass into chamber (14) and then into the airbag, and also includes a further pyrotechnic squib (22a) which is fired some time after the squib (22) and causes the sealing foils over the further openings (18a) to boost the discharge of gases from the gas bottles. In this way, and by selecting the relative sizes of the first and further discharge openings (18,18a) the inflation rate of the air bag with respect to time can be fitted to a desired profile.

17 Claims, 2 Drawing Sheets

INFLATOR FOR AN AIR-BAG

CROSS-REFERENCE TO RELATED APPLICATIONS

Figure 1:
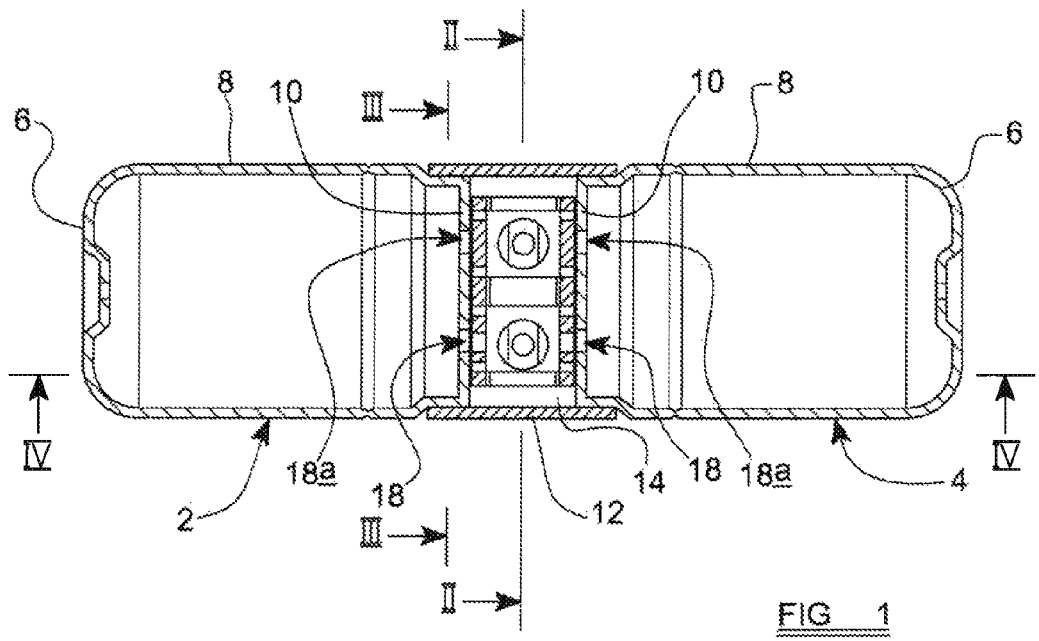

This application is a 371 U.S. National Stage of International Application No. PCT/GB2008/000122, filed Jan. 15, 2008, the disclosures of which are incorporated herein by reference in their entirety.

THE PRESENT INVENTION relates to an inflator for an air-bag, such as an air-bag provided in a vehicle to provide protection for an occupant of the vehicle in the event of an accident.

It has been proposed to provide air-bag inflators which incorporate two bottles or pressure vessels containing gas under pressure, each bottle or pressure vessel having an outlet which is normally sealed by sealing means, which sealing means is displaced or ruptured in an emergency situation, for example by the firing of a pyrotechnic squib, to allow the gas to escape from the bottle into the airbag. In prior proposed inflators of this general type one gas bottle may contain a fuel, in the form of an oxidisable gas and the other bottle may contain an oxidising gas. The gases, when they escape from the gas bottles are mixed and are ignited by ignitor means, whilst they are being passed to the air bag, or when the gases are within the air-bag, to effect complete inflation of the air-bag. GB2417066 discloses an inflator of this type.

It is an object of the invention to provide an improved airbag inflator, of the kind set out above, which provides for a more closely controlled burning of such gas mixture supplied to the connected airbag and inflation of the airbag than prior art bag inflators provide.

According to the invention there is provided an inflator for an airbag, comprising a bottle containing a pressurised oxidisable gas and a bottle containing a pressurised oxidising gas, the bottles being connected with a structure providing a chamber with at least one outlet for communication with a vehicle airbag, the bottles having respective first discharge openings sealed by respective sealing means sealing off the interiors of said bottles from said chamber, the inflator including first operating means which can be activated to cause or allow the seals provided by said sealing means to be broken to allow the gases from said bottles to pass into said chamber and thence via said outlet into such airbag, characterised in that at least one of said bottles has a further discharge opening, sealed by its own sealing means, the inflator including further operating means operable with a different timing from said first operating means, or operable in a sub-set of the circumstances in which said first operating means is operable, for causing or allowing the seal provided by the sealing means for said further discharge opening to be broken to allow gas to escape from said further discharge opening into said chamber and thence to said airbag.

Said structure may include a conduit extending from said chamber for connection with a vehicle airbag, or the inflator may be designed as a tubular inflator with outlet holes around the circumference of the central structure.

The first operating means and the further operating means may each include a respective piston movable along a respective complementary cylinder by pressure of gases generated by a respective pyrotechnic squib, when the latter is ignited.

Alternatively, said first operating means may include a piston movable along a complementary cylinder by pressure of gases generated by a pyrotechnic squib when the latter is ignited, whilst said further operating means may operate in some other way, for example, may comprise a strap or ligature coupled to the airbag so as to pull an unsealing element of said second operating means at a predetermined stage in the deployment of the airbag, or may comprise a mechanism operable by decelerational or accelerational G-forces. Thus, for example, the further operating means may serve to inflate the airbag more rapidly where an impact of the vehicle in which the system is fitted with another vehicle or obstacle is particularly severe.

In preferred embodiments of the invention both of said gas bottles have respective further discharge openings, sealed by respective further sealing means, with said further operating means being operable to cause or allow the seals provided by the sealing means for said further discharge openings of both of said gas bottles to be broken. In these preferred embodiments, the further discharge openings of the two gas bottles may be of different sizes from one another.

Preferably each gas bottle has its said first discharge opening sealed by a respective rupturable foil, and said first operating means which can be activated to cause or allow the respective seals for said first discharge openings to be broken includes respective support members engaging the rupturable foils to maintain the rupturable foils in an unruptured state, each said support member being retained in position by a part carried by a piston movable along a complementary cylinder by pressure of gases generated by a first pyrotechnic squib and which piston part directly engages the support member, the arrangement being such that movement of such piston along its cylinder as a result of firing the associated squib thereby moves said part carried by the respective piston past the respective support members, permitting the support members to move to positions in which the foils will rupture to permit gas to escape from the gas bottle.

Preferably the or each said further discharge opening is likewise sealed by a rupturable foil, or by respective rupturable foils, said further operating means likewise including a respective further support member or support members engaging the rupturable foil or foils sealing the further discharge opening or openings to maintain the last noted foils in an un-ruptured state, the or each said further support member being retained in position by a part carried by a further said piston moveable in a further complementary cylinder by pressure of gases generated by a further pyrotechnic squib, the arrangement likewise being such that movement of the further piston along said further cylinder as a result of firing said further squib thereby moves said part of said further piston past said further support member or members, permitting the further support member or members to move to a position or positions in which the foils will rupture to permit gas to escape also through said further discharge opening or openings.

In a preferred embodiment, each of the two bottles has a respective further discharge opening with a respective further sealing foil and respective support members and said further piston is common to both said further discharge openings.

Conveniently the fuel or oxidisable gas in one gas bottle comprises hydrogen, ethane, methane, propane or butane.

Advantageously the oxidisable gas is mixed with one or more inert gases.

Preferably the oxidising gas in the other gas bottle is air, oxygen or nitrous oxide.

Conveniently the oxidising gas is mixed with one or more inert gases.

The invention also relates to an air-bag provided with an inflator of the type described above.

Figures 2, 3:
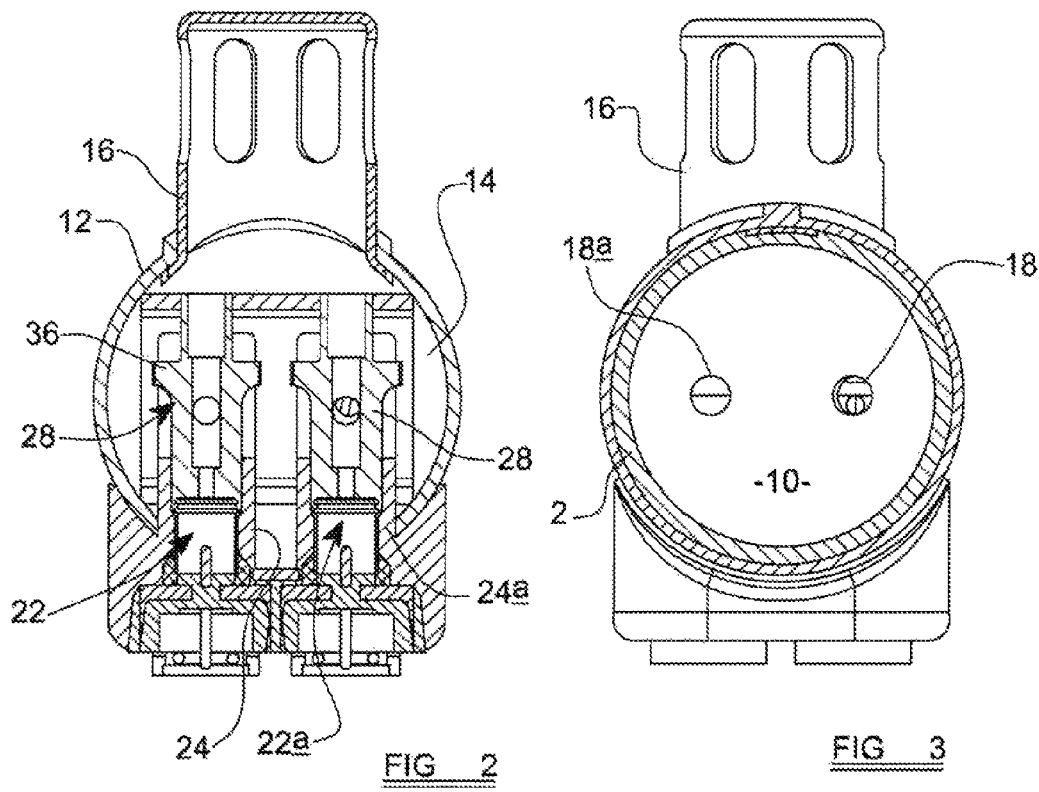
Figure 4:
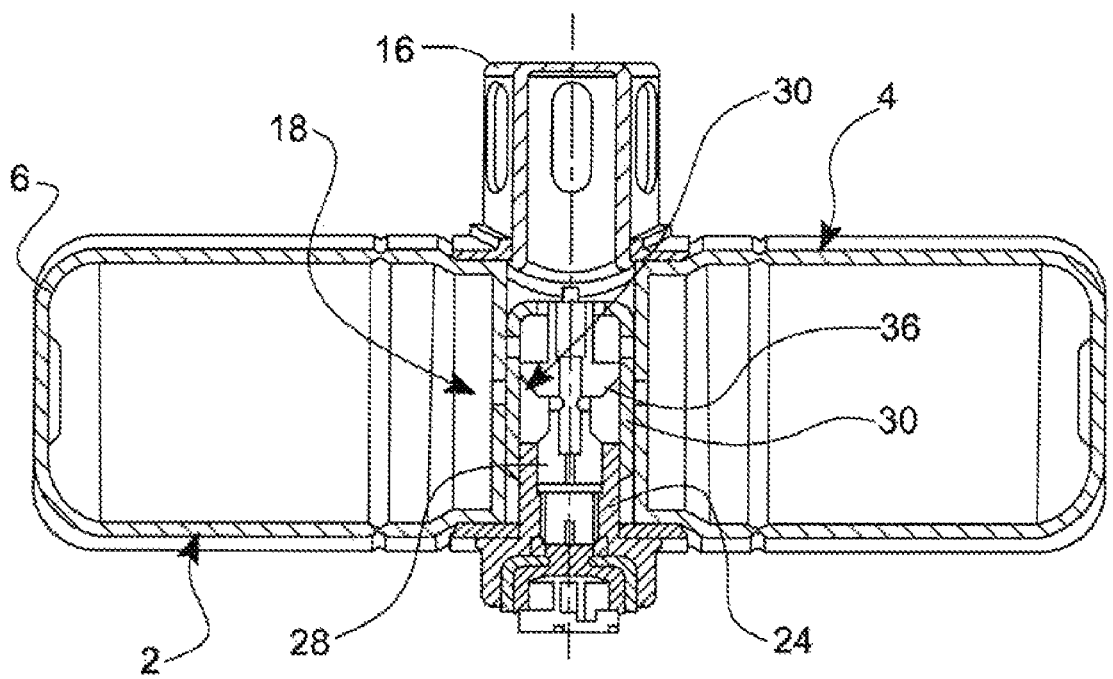

An embodiment of the invention is described below by way of example with reference to the accompanying drawings in which:

FIG. 1 is a view in section showing part of an airbag inflator in accordance with the invention, FIG. 2 is a view in section along the line II-II of FIG. 1, FIG. 3 is a sectional view corresponding to FIG. 2 but with parts omitted for purposes of illustration, and FIG. 4 is a view in vertical section along line IV-IV in FIG. 1.

Referring to FIG. 1, an air-bag inflator comprises a first gas bottle 2 and a second gas bottle 4. In the arrangement shown, the second bottle 4 is the mirror-image of the first bottle 2. Each gas bottle 2, 4, has a respective base 6 at one end, a respective tubular side wall 8 and a planar end wall 10 at its end opposite the base 6. A respective filling aperture is provided in each base 6. The ends of the gas bottles 2 and 4 opposite said bases 6 thereof are secured to a central housing 12 which defines, with respective opposing parallel spaced-apart planar end walls 10 of the bottles 2, 4, a chamber 14. An upper part 16 of housing 12 forms a conduit extending from or forming part of the chamber 14. Upper part 16 is provided with openings for the exit of gas. In use, the upper end 16 of the housing 12, with said openings, is fitted within the mouth of a vehicle airbag (not shown) which is sealed around said upper part of the housing. In a variant, the conduit 16 may be replaced by openings formed directly in the housing 12 for communication with an airbag.

One gas bottle 2 contains a fuel in the form of a combustible gas such as, for example, hydrogen, methane, ethane, propane or butane, or a mixture of one or more such gases. The fuel may be provided in a pure form or in admixture or mixed with an inert gas such as nitrogen, argon, helium or carbon dioxide. The pressure of gas within the bottle may be such that the gas is in partly liquefied form. The other gas bottle 4 contains an oxidising gas such as air, oxygen or nitro-oxide. The oxidising gas may be again mixed with an inert gas such as nitrogen, argon, helium, carbon dioxide or mixtures thereof. Again the pressure may be such that the gas is partially liquefied.

As best shown in FIG. 3, formed in the end wall 10 of each bottle 2, 4, is a respective first outlet or discharge opening 18, and a respective further discharge opening 18a, the openings 18 and 18a being sealed by means of a respective metal foils extending across the openings 18 and 18a on the outer face of the respective wall 10 and adhesively secured to that outer face. A first squib 22 is mounted in a squib housing 24 carried by the central housing 12 and located between the opposing parallel end walls 10 of the gas bottles 2, 4. The squib housing 24 provides a cylinder with an axial bore accommodating a complementary piston 28. The upper part of the squib housing 24 supports a bracket which has two integral planar arms 30, (see FIG. 4), which are parallel with and lie against respective end walls 10 of the bottles 2 and 4 and extend across the respective sealing foils covering the respective first discharge openings 18. The arms 30 are each provided with a respective line of mechanical weakness at a position where the arm is connected to the bracket on the squib housing. The squib housing 24 and the arms 30 may be formed as an integral plastic moulding.

The piston 28 includes a piston rod which extends axially from the cylinder in which the piston is located, between the two arms 30, and carries outwardly directed support flanges 36 which, in the initial position of the components illustrated in the drawings, directly engage the free ends of the respective arms 30. In this position, the arms 30 act as support members to support the foils over openings 18 and are in turn supported by the support flanges 36.

Likewise, a second squib 22a is mounted in a squib housing 24a carried by the central housing 12 and similarly located between the opposing parallel end walls 10 of the gas bottles 2, 4. The squib housing 24a is likewise provides a cylinder with an axial bore accommodating a complementary piston (28a). The upper part of the squib housing 24a likewise supports a bracket which has two integral planar arms, identical with arms 30, which parallel with and lie against respective end walls 10 of the bottles 2 and 4 and extend across the sealing foils which cover the further openings 18a. The last mentioned arms are likewise each provided with a respective line of mechanical weakness at a position where the arm is connected to the respective bracket on the squib housing. The squib housing 24a and the associated arms may again be formed as an integral plastic moulding.

Thus, in the embodiment illustrated, the discharge openings 18,18a are spaced apart laterally on either side of the centre line of the two gas bottles 1, 2, with the openings 18 directly opposing and aligned with each other and with the openings 18a directly opposing and aligned with each other. The further operating means, comprising the squib 22a, housing 24a and its cylinder and piston 28a, with the associated support arms and piston head flanges, is identical with, or a mirror image of, the first operating means comprising the squib 22, housing 24 and its cylinder and piston 28, with the associated support arms and piston head flanges. These pistons and cylinders are parallel with one another but are spaced apart laterally in correspondence with the lateral spacing of the openings 18, 18a.

In the initial position of the components illustrated in the drawings, the support flanges of the pistons directly engage the free ends of the respective support arms which support the foils covering the openings 18,18a.

When the airbag is to be inflated, the first squib 22 will be fired. Gas generated by the squib will apply a force moving the piston 28 axially, along its cylinder. The piston thus moves to a position in which the outwardly directed flanges 36 are moved past the free ends of the arms 30 so that the arms 30 are no longer supported at their free ends. This enables the arms 30 to pivot inwardly, about their lines of mechanical weakness, so that the arms 30 no longer provide support for the foils covering the openings 18, enabling the foils to be ruptured by gas pressure within the gas bottles 2 and 4. Gas from the gas bottles 2 and 4 will thus flow through the openings 18, into chamber 14 and out through the gas flow apertures in the tubular part 16 into the interior of the airbag. As the gases flow, so will the gases be mixed. The arrangement described for unsealing the discharge openings is substantially as described in GB2417066. The hot gases produced by the firing of the squib 22 may be directed into chamber 14 to ignite the mixture of the gases discharged from the gas bottles 1 and 2. These hot gases can alternatively be passed directly into the airbag or to some other desired location.

At a predetermined time after the squib 22 is fired, the squib 22a is fired so that the piston 28a moves to a position in which the outwardly directed flanges thereon are moved past the free ends of the associated supporting arms so that the latter are no longer supported at their free ends and can thus pivot inwardly about their lines of mechanical weakness and no longer provide support for the foils covering openings 18a, enabling these foils also to be ruptured by the remaining gas pressure within the gas bottles 2 and 4. Accordingly, at that stage, gas from the gas bottles 2 and 4 can thus flow, with less flow restriction, through the combined openings 18, 18a into the chamber 14 and thence into the interior of the air bag.

Thus, the arrangement of the invention allows a two-stage operation, with the first openings 18 being unsealed in the first stage and the further openings 18a being also unsealed in the second stage. This two-stage procedure can for example, provide an increased gas flow from the gas bottles, (increased as compared with what it would be in the absence of openings 18a), at a predetermined time after activation of the inflator, to increase the inflating flow from the inflator at that time. The variation of gas flow with time may be "tailored" to some extent by selection of the respective sizes of the openings 18 and 18a as well as the respective times of firing of the squibs 22, 22a. Thus the openings 18a may be larger or smaller than the openings 18, and/or the opening 18a in the gas bottle 2 may be larger or smaller than the opposing opening 18a in the gas bottle 4. In some embodiments, one gas bottle may have only a single discharge opening with only the other gas bottle having a first discharge opening and a further discharge opening, allowing preferential flow of the gas from one gas bottle, relative to that from the other over the respective part of the airbag inflation.

The relative timing of the firing of the two squibs 22, 22a may be fixed, for example by igniting the squib 22a by a time fuse ignited by the squib 22, or may be variable as determined by a control facility in response to sensed crash conditions, for example depending upon sensed acceleration or deceleration in a crash situation. Indeed, in some arrangements, the further discharge openings 18a may be unsealed only in a predetermined subset of the conditions in which the first discharge openings 18 are unsealed, for example if sensed deceleration is particularly high or sensed vehicle speed before a crash is particularly high, allowing rapidity of bag inflation to be matched to some extent with the seriousness of the crash situation.

The further operating means for unsealing of the further discharge opening or openings may be operated in some other way than by ignition of a pyrotechnic squib, (as, indeed, may be the operating means for unsealing the first discharge openings). Thus, in one variant, the first discharge openings may be unsealed by operation of a squib-activated device as described above, whilst the second stage may be triggered mechanically after the airbag has been inflated to a certain size. Thus, for example, a moveable element, for example initially bracing supporting arms for the foils covering the further discharge openings in the same way as described above with reference to the drawings, may be connected with a strap secured to the fabric of the airbag, to be moved mechanically, by being pulled by the strap, into a position allowing opening of the further dischargeable openings once the airbag has been inflated to a predetermined size. This arrangement may, for example, prevent the second stage from triggering and the further discharge openings from being unsealed, if inflation of the bag is blocked, for example, an occupant of the vehicle being out of position. In this variant, of course, only one pyrotechnic squib is required for operation of the mechanism and sealing the first discharge openings 18.

As indicated above, the performance of the inflator may be varied over a wide range, depending upon circumstances. Indeed, even in a particular installation in a particular vehicle, the way in which the inflator performs may be tailored to the conditions of any particular crash situation by appropriate control of the respective timings of operation of the operating means for the openings 18 and 18a, by control means operating in dependence on signals from appropriate sensors. Such control may be effected particularly readily if these operating means take the form of pyrotechnic squibs as described above. Thus, for example, in some circumstances only squib 22 may be triggered so that inflator performance is determined by gas flow through openings 18, or in other circumstances only squib 22a may be triggered so that inflator performance is determined by gas flow through openings 18a. In yet further circumstances, both squib 22 and squib 22a may be triggered simultaneously so that inflator performance is determined by gas flow through both openings 18 and openings 18a. Again, if squib 22 is triggered first and then squib 22 is triggered after a delay, this will give an initial bag inflation as in the case where only squib 22 is triggered, with further inflation taking place as a result of gas flow through 18a. It is also possible to trigger squib 22a first and then to trigger squib 22 after a delay. This will give a primary bag inflation as for the case in which only squib 22a is triggered, with further inflation taking place as a result of gas flow through opening 18.

When used in this Specification and Claims, the terms "comprises" and "comprising" and variations thereof mean that the specified features, steps or integers are included. The terms are not to be interpreted to exclude the presence of other features, steps or components.

The invention claimed is:

1. An inflator for an airbag comprising:
a first bottle containing a pressurized oxidisable gas and a second bottle containing a pressurized oxidising gas, the first and second bottles being connected with a structure providing a chamber with at least one outlet for communication with such vehicle airbag, the first and second bottles each having a first discharge opening sealed by respective sealing means sealing off the interiors of the first and second bottles from the chamber, the inflator including first operating means which can be activated to cause or allow the seals provided by the sealing means to be broken to allow the gases from the first and second bottles to pass into the chamber and thence via the outlet or outlets into such airbag, at least one of the first and second bottles having a further discharge opening, sealed by its own sealing means, the inflator including further operating means operable with a different timing from the first operating means, or operable in a sub-set of the circumstances in which the first operating means is operable, for causing or allowing the seal provided by the sealing means for the further discharge opening to be broken to allow gas to escape from the further discharge opening into the chamber and thence to the airbag.

2. The inflator according to claim 1, including a conduit extending from the chamber for connection with such airbag and providing the outlet or outlets.

3. The inflator according to claim 1, wherein the first operating means and the further operating means each include a respective piston movable along a respective complementary cylinder by pressure of gases generated by a respective pyrotechnic squib, when the latter is ignited.

4. The inflator according to claim 1, wherein the first operating means includes a piston movable along a complementary cylinder by pressure of gases generated by a pyrotechnic squib when the latter is ignited, whilst the further operating means is operable in some other way.

5. The inflator according to claim 1, in combination with an airbag, wherein the first operating means includes a piston movable along a complementary cylinder by pressure of gases generated by a pyrotechnic squib when the latter is ignited, whilst the further operating means includes a strap or ligature coupled to the airbag so as to pull an unsealing element of the second operating means at a predetermined stage in the deployment of the airbag.

6. The inflator according to claim 1, wherein the first operating means includes a piston movable along a complementary cylinder by pressure of gases generated by a pyrotechnic squib when the latter is ignited, whilst the further operating means comprises a mechanism operable by decelerational or accelerational G-forces.

7. The inflator according to claim 1, wherein both of the first and second bottles have respective further discharge openings, sealed by respective further sealing means, with the further operating means being operable to cause or allow the seals provided by the sealing means for the further discharge openings of both of the first and second bottles to be broken.

8. The inflator according to claim 7, wherein the further discharge openings of the first and second bottles are of different sizes from one another.

9. The inflator according to claim 1, wherein each of the first and second gas bottle has the first discharge opening sealed by a respective rupturable foil, and the first operating means which can be activated to cause or allow the respective seals for the first discharge openings to be broken includes respective support members engaging the rupturable foils to maintain the rupturable foils in an unruptured state, the support members being retained in position by parts carried by a piston movable along a complementary cylinder by pressure of gases generated by a first pyrotechnic squib and which parts directly engage the support members, the arrangement being such that movement of such piston along its cylinder as a result of firing the associated squib thereby moves the parts carried by the respective piston past the respective support members, permitting the support members to move to positions in which the foils will rupture to permit gas to escape from the bottle.

10. The inflator according to claim 9, wherein the or each of the further discharge opening is likewise sealed by a rupturable foil, or by respective rupturable foils, the further operating means likewise including a respective further support member or support members engaging the rupturable foil or foils sealing the further discharge opening or openings to maintain the last noted foils in an un-ruptured state, the or each of the further support member being retained in position by a part carried by a further piston moveable in a further complementary cylinder by pressure of gases generated by a further pyrotechnic squib, the arrangement likewise being such that movement of the further piston along the further cylinder as a result of firing the further squib thereby moves the part of the further piston past the further support member or members, permitting the further support member or members to move to a position or positions in which the foils covering the further openings will rupture to permit gas to escape also through the further discharge opening or openings.

11. The inflator according to claim 10, wherein each of the first and second bottles has a respective further discharge opening with a respective further sealing foil and a respective further support member and the further piston is common to the further operating means for both the further discharge openings.

12. The inflator according to claim 1, wherein, in at least one of the first and second bottles, partitioning means is provided dividing the interior of the at least one bottle into a first volume communicating with the first discharge opening of the bottle and a second volume communicating with the further discharge opening of the at least one bottle.

13. The inflator according to claim 1, wherein the further discharge opening in one of the bottles is larger or smaller than the further discharge opening in that bottle.

14. The inflator according to claim 1, in combination with control means by which the sequence and timing of the activation of the first and further operating means is controllable to control inflator performance according to the circumstances of particular crash situations.

15. The inflator according to claim 1, in combination with control means operable to activate only the first operating means, or only the further operating means, or to activate the first operating means followed by the further operating means, or to activate the further operating means followed by the first operating means, according to the circumstances of particular crash situations.

16. The combination according to claim 14, wherein the control means is operable in dependence on signals from sensors.

17. The combination according to claim 15, wherein the control means is operable in dependence on signals from sensors.

* * * * *